(12) United States Patent
Asano et al.

(10) Patent No.: US 10,693,334 B2
(45) Date of Patent: Jun. 23, 2020

(54) ELECTRIC ROTARY MACHINE

(71) Applicants: DAIKIN INDUSTRIES, LTD., Osaka-shi, Osaka (JP); NAGOYA INSTITUTE OF TECHNOLOGY, Nagoya-shi, Aichi (JP)

(72) Inventors: Yoshinari Asano, Osaka (JP); Toshinari Kondou, Osaka (JP); Yoshihito Sanga, Osaka (JP); Takashi Kosaka, Nagoya (JP)

(73) Assignees: DAIKIN INDUSTRIES, LTD., Osaka-Shi, Osaka (JP); NAGOYA INSTITUTE OF TECHNOLOGY, Nagoya-Shi, Aichi (JP)

( * ) Notice: Subject to any disclaimer, the term of this patent is extended or adjusted under 35 U.S.C. 154(b) by 0 days.

(21) Appl. No.: 16/604,054

(22) PCT Filed: Apr. 12, 2018

(86) PCT No.: PCT/JP2018/015419
§ 371 (c)(1),
(2) Date: Oct. 9, 2019

(87) PCT Pub. No.: WO2018/193969
PCT Pub. Date: Oct. 25, 2018

(65) Prior Publication Data
US 2020/0036251 A1 Jan. 30, 2020

(30) Foreign Application Priority Data

Apr. 21, 2017 (JP) .................................. 2017-084804

(51) Int. Cl.
*H02K 1/16* (2006.01)
*H02K 1/17* (2006.01)
(Continued)

(52) U.S. Cl.
CPC ................. *H02K 3/12* (2013.01); *H02K 1/16* (2013.01); *H02K 1/17* (2013.01); *H02K 3/04* (2013.01); *H02K 19/12* (2013.01); *H02K 21/04* (2013.01)

(58) Field of Classification Search
CPC .. H02K 3/12; H02K 1/16; H02K 1/17; H02K 3/04; H02K 19/12; H02K 21/04
See application file for complete search history.

(56) References Cited

U.S. PATENT DOCUMENTS

| | | | |
|---|---|---|---|
| 6,262,508 B1 * | 7/2001 | Shibayama | H02K 21/00 310/152 |
| 10,277,100 B2 * | 4/2019 | Asano | H02K 21/04 |

(Continued)

FOREIGN PATENT DOCUMENTS

| | | |
|---|---|---|
| JP | 2013-201869 A | 10/2013 |
| JP | 2013-226028 A | 10/2013 |
| JP | 2017-63597 A | 3/2017 |

OTHER PUBLICATIONS

International Search Report, issued in PCT/JP2018/015419, PCT/ISA/210, dated Jul. 3, 2018.
(Continued)

*Primary Examiner* — John K Kim
(74) *Attorney, Agent, or Firm* — Birch, Stewart, Kolasch & Birch, LLP

(57) ABSTRACT

A stator core including field slots housing field windings and armature slots housing armature windings is provided. Permanent magnets are housed in the respective armature slots. The armature windings are configured by a first winding and at least one second winding. The field winding passes over the permanent magnet. The second windings each have a part embedded between a coil end of the field winding and teeth around which the field winding is around.

6 Claims, 10 Drawing Sheets

(51) Int. Cl.
*H02K 3/12* (2006.01)
*H02K 3/04* (2006.01)
*H02K 19/12* (2006.01)
*H02K 21/04* (2006.01)

(56) References Cited

U.S. PATENT DOCUMENTS

| | | | |
|---|---|---|---|
| 2013/0049494 A1* | 2/2013 | Jung | H02K 21/44 |
| | | | 310/46 |
| 2014/0285056 A1* | 9/2014 | Tomohara | H02K 3/12 |
| | | | 310/208 |
| 2014/0300236 A1 | 10/2014 | Takizawa et al. | |
| 2017/0346374 A1* | 11/2017 | Bouvier | H02K 21/44 |
| 2019/0058381 A1 | 2/2019 | Asano et al. | |
| 2020/0036251 A1* | 1/2020 | Asano | H02K 1/17 |

OTHER PUBLICATIONS

Written Opinion of the International Searching Authority, issued in PCT/JP2018/015419, PCT/ISA/237, dated Jul. 3, 2018.

* cited by examiner

ELECTRIC ROTARY MACHINE

TECHNICAL FIELD

The present invention relates to a electric rotary machine.

BACKGROUND ART

Among electric motors, which are one type of electric rotary machines, there is known a hybrid excitation flux switching motor (hereinafter also referred to as HEFSM). In the HEFSM, a stator includes both windings and permanent magnets. The HEFSM has an operating mode in which the magnetic flux of the permanent magnets flows from the stator to a rotor (see for example Patent Document 1). In the invention of Patent Document 1, predetermined windings (field windings) are in contact with some of permanent magnets. The conduction of direct current to the field windings is controlled to control the magnetic flux of the permanent magnets. In addition, AC power is supplied to the other windings (armature windings) for forming rotating magnetic field to rotate the rotor.

CITATION LIST

Patent Document

Patent Document 1: Japanese Unexamined Patent Publication No. 2013-201869

SUMMARY OF THE INVENTION

Technical Problem

However, it is common among the hybrid excitation flux switching motors that there are two types of windings, i.e., field windings and armature windings, which are arranged in a complicated manner, often causing larger coil ends and sometimes resulting in a smaller space factor. This becomes even more problematic, particularly in case where field windings are provided on both the inner and the outer circumferential sides of the permanent magnets, because the windings are arranged in a much more complicated manner. Accordingly, in the hybrid excitation flux switching motors, it is not easy to increase the conducting cross-sectional area of each of the armature windings in its associated slot.

The present invention has been made in view of the above problems, and an object of the present invention is to keep a coil end from increasing in size in a hybrid excitation flux switching motor while making it possible to increase the conducting cross-sectional area of each of armature windings in its associated slot.

Solution to the Problem

To achieve the above object, a first aspect is directed to a electric rotary machine comprising: at least one field winding (23) supplied with direct current; at least one armature winding (24) supplied with alternative current; a stator core (21) formed into a circular shape having a plurality of field slots (213a) and a plurality of armature slots (213b) arranged side by side in a circumferential direction, the field slots (213a) being slots (213) in which the field windings (23) are arranged, the armature slots (213b) being slots (213) in which the armature windings (24) are arranged; at least one permanent magnet (22) housed in each of the field slots (213a); a rotor core (11) facing the stator core (21) with a predetermined air gap (G) interposed therebetween; and a first winding (24a) and at least one second winding (24b, 24c) constituting one of the armature windings (24), the first winding (24a) passing over the permanent magnet (22), the second windings (24b, 24c) each having a part embedded between a coil end (23a) of the field winding (23) and a teeth (211) around which the field winding (23) is around.

With this configuration, in the stator core (21), the field windings (23) and the armature windings (24) are wound while the increase in the axial length of the coil end due to the overlap of these two types of the windings is minimized.

Further, a second aspect according to the first invention is directed to a electric rotary machine in which the field windings (23) are arranged both on an inner circumferential side and an outer circumferential side of the permanent magnets (22), and the armature windings (24) each include the second windings (24b, 24c) respectively corresponding to an inner and an outer coil ends (23a) of the corresponding field windings (23).

With this configuration, in the electric rotary machine (1) having the field windings (23) on both the inner circumferential side and the outer circumferential side of the permanent magnets (22), the field windings (23) and the armature windings (24) are wound while the increase in the axial length of the coil end due to the overlap of these two types of the windings is minimized.

Further, a second aspect according to the second invention is directed to a electric rotary machine in which the second windings (24b, 24c) are kept from going out of the field windings (23) in a radial direction.

Furthermore, a fourth aspect according to any one of the first to third inventions is directed to the electric rotary machine, in which the first winding (24a) and the second windings (24b, 24c) have the same impedance and the same number of turns, and are parallely connected to each other.

Furthermore, a fifth aspect according to any one of the first to third inventions is directed to the electric rotary machine, in which the first winding (24a) and the second windings (24b, 24c) are connected to each other in series.

Furthermore, a sixth aspect according to any one of the first to fifth inventions is directed to the electric rotary machine, in which the field windings (23) and the armature windings (24) are at least one of edge-wise coils obtained by bending flat type conductive wires and flat-wise coils.

With this configuration, the field windings (23) and the armature windings (24) can be formed with excellent dimensional accuracy.

Advantages of the Invention

According to the first aspect, it is possible to increase the conducting cross-sectional area of each of the armature windings in its associated slot while avoiding the increase in size of the coil end.

According to the second aspect, in a electric rotary machine having field windings on both the inner and the outer circumferential sides of the permanent magnet, it is possible to increase the conducting cross-sectional area of each of the armature windings in its associated slot while avoiding the increase in size of the coil end.

According to the third aspect, it is possible to shorten the radial width of the windings.

According to the sixth aspect, in the electric rotary machine, it is possible to decrease copper loss and to improve the space factor.

DESCRIPTION OF EMBODIMENTS

Embodiments of the present invention will be described in detail below with reference to the drawings. The embodiments below are merely exemplary ones in nature, and are not intended to limit the scope, applications, or use of the present invention.

First Embodiment

Figure 1:
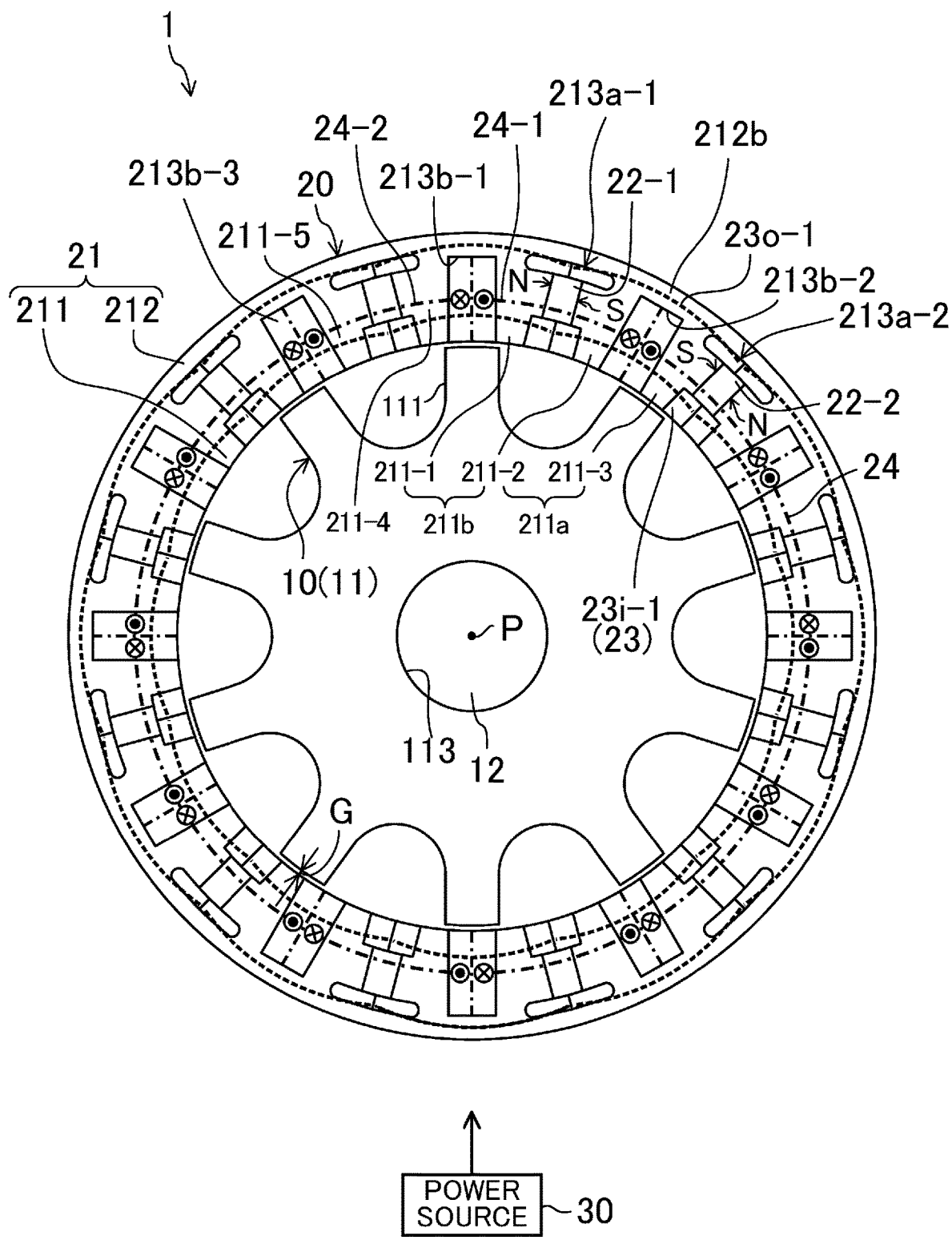
FIG. 1 is a cross-sectional view showing a structure of an electric motor of a first embodiment.

Hereinafter, an example of an electric motor will be described as an example of the electric rotary machine of the present invention. FIG. 1 is a cross-sectional view showing a structure of an electric motor (1) of a first embodiment. This electric motor (1) is an example of an HEFSM. As shown in FIG. 1, the electric motor (1) includes a rotor (10) and a stator (20) that are opposite to each other with a predetermined air gap (G) interposed therebetween, and housed in a casing (not shown). The electric motor (1) can be used for a motor vehicle or for a compressor of an air conditioner. The electric motor (1) drives, with a drive shaft (12) provided in the rotor (10), a motor vehicle transmission or the compressor of the air conditioner.

Out of the terms used in the following description, an "axial" direction is the direction in which an axis (P) of a drive shaft (12) extends, whereas a "radial" direction is the direction orthogonal to the axis (P). An "outer circumferential side" of a component is a side farther from the axis (P), while an "inner circumferential side" refers to a side closer to the axis (P).

<Rotor>

The rotor (10) includes a rotor core (11) and the drive shaft (12). The rotor core (11) is made of a soft magnetic material. The rotor core (11) of the present embodiment is a multilayer core formed by stacking, in the axial direction, many core members obtained by pressing an electromagnetic sheet. In the center of the rotor core (11), there is formed a through-hole (113), into which the drive shaft (12) is inserted, as shown in FIG. 1. The rotor core (11) includes a plurality of projections (111) projecting toward the outer circumferential side. The projections (111) are arranged at regular pitches in the circumferential direction of the rotor core (11). That is, the rotor core (11) has a gear-like shape as viewed in the axial direction. The projections (111) are disposed because of difference in inductance resulting from the relative position of the rotor (10) with respect to the stator (20). It is also possible to provide the stator core formed into a thin shape along the outer circumference of a concave portion so that the entire outer circumference of the rotor (10) may be an exact circle. The projections (111) are not necessarily arranged at exact regular intervals.

<Stator>

The stator (20) includes a stator core (21), permanent magnets (22), field windings (23) and armature windings (24).

Figure 2:
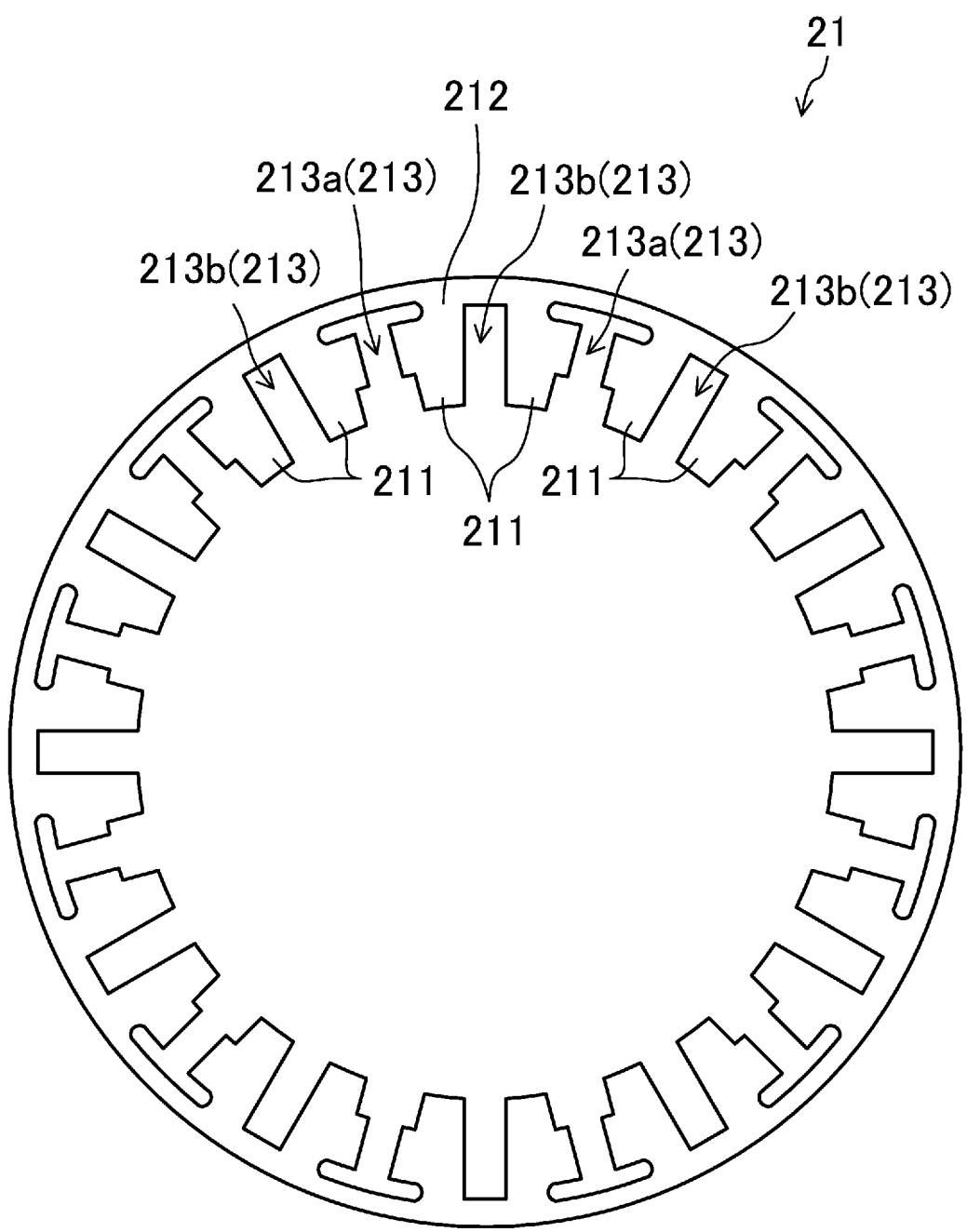
FIG. 2 is a view of a stator core as viewed in an axial direction.

The stator core (21) is made of a soft magnetic material and formed into a ring-like shape. In this example, the stator core (21) is a multilayer core formed by stacking, in the axial direction, many core members obtained by pressing an electromagnetic sheet. FIG. 2 illustrates the stator core (21) as viewed in the axial direction. As shown in FIG. 2, the stator core (21) includes a stator yoke (212) and a plurality of teeth (211). The stator yoke (212) is formed in a ring-like shape on the outer circumferential side of the stator core (21). The teeth (211) project from the inner circumferential surface of the stator yoke (212) toward the inner circumferential side. In the example of FIG. 2, 24 teeth (211) are formed that are arranged at predetermined pitches in the circumferential direction around the axis (P). As a result, a space is formed between each adjacent pair of the teeth (211).

These spaces formed between the respective adjacent teeth (211) function as slots (213) housing the permanent magnets (22), the field windings (23) and the armature windings (24). The slots (213) include two types: field slots (213a); and armature slots (213b). Specifically, the field slots (213a) are pairs of the slots (213), each of which are adjacent to each other along the circumference of the stator yoke (212), with one of the slots interposed therebetween. The armature slots (213b) are those of the slots (213) which are other than the field slots (213a). In other words, the field slots (213a) and the armature slots (213b) are arranged alternately along the circumference of the stator yoke (212). Hereinafter, if specific ones of the elements, such as the field slots (213a) and the armature slots (213b) existing in plurality are focused on, branch numbers will be added to their reference characters (for example, 213a-1, 213a-2 etc.).

—Permanent Magnets (22)—

The stator (20) is provided with a plurality of permanent magnets (22). In this example, the permanent magnets (22) are rare-earth magnets made of rare-earth elements. More specifically, the permanent magnets (22) are magnets (neodymium-iron-boron based magnets) containing neodymium, iron and boron as main components, and rare-earth magnets containing, if necessary, an alloy made of a heavy rare-earth element (e.g., dysprosium (Dy) or terbium (Tb)) or sintered magnets containing, only around their surface, a heavy rare-earth element by grain boundary diffusion.

Each of the permanent magnets (22) is formed into a quadrangular shape in its cross section (the plane shown in FIG. 1) orthogonal to the axis (P) (in this example, a rectangular cross-section with longer sides extending in the radial direction). The permanent magnets (22) have almost the same axial length as the stator core (21). That is, the permanent magnets (22) of this embodiment are rectangular parallelepipeds. Each of these permanent magnets (22) is arranged in the corresponding one of the field slots (213a) such that each magnetic pole face of one of the permanent magnets (22) faces to the magnetic pole face, of the adjacent one of the permanent magnets (22) with the same polarity, along the circumference of the stator yoke (212) (see FIG. 1). In other words, the permanent magnets (22) are magnetized along the circumference of the stator yoke (212). These permanent magnets (22) are arranged such that their magnetic pole faces facing in one direction along the circumference of the stator yoke (212) have alternately different polarity.

—Field Windings (23)—

Figure 3:
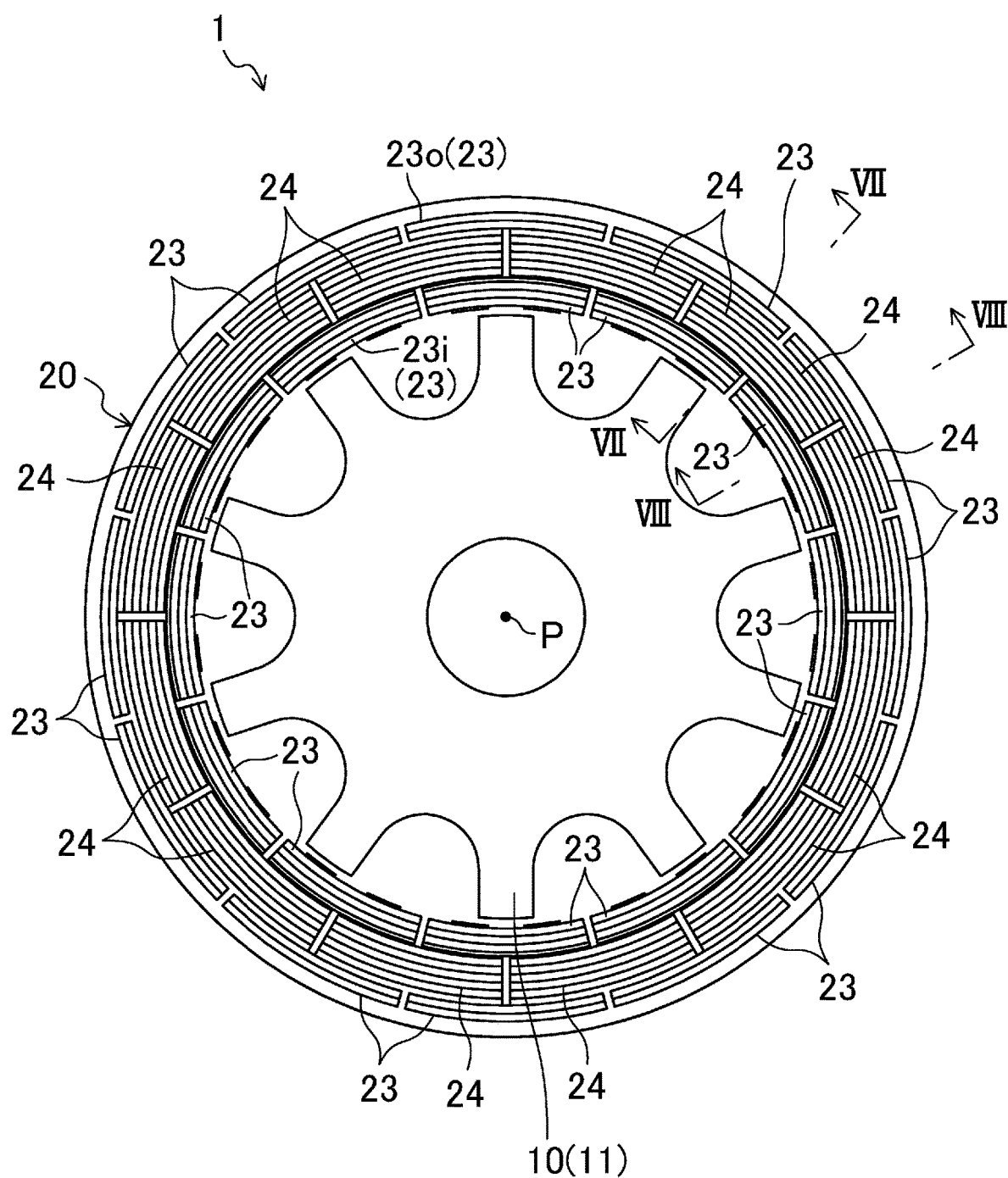
FIG. 3 is a view showing an arrangement of field windings and armature windings in the axial direction.

The field windings (23) are configured for controlling the magnetic flux of the permanent magnets (22). Each of these field windings (23) is wound around the corresponding teeth (211) and housed in the corresponding one of the field slots (213a). In this example, two field windings (23) are wound around the corresponding one of the pairs of teeth (211) (hereinafter also referred to as a pair of field teeth (211a)) interposed between one of pairs of field slots (213a), which are adjacent to each other along the circumference of the stator yoke (212). Specifically, each of two field windings (23) is wound around the corresponding one of the pairs of field teeth (211a), with the radial axis regarded as the winding axis. In other words, two of the field windings (23) are, as concentrated windings, wound around one of the pairs of field teeth (211a) regarded as a single teeth. In this way, according to this embodiment of the present invention, two of the field windings (23) are housed in the corresponding one of the field slots (213a). In this example, two field windings (23) in the corresponding one of the field slots (213a) are adjacent to each other along the circumference of the stator yoke (212). FIG. 3 shows an arrangement of the field windings (23) and the armature windings (24) viewed in the axial direction. Note that the intervals between the windings are depicted in a larger scale in FIG. 3 for the purpose of clarifying the boundaries between the windings. However, each clearance between the corresponding windings is, though not limited thereto, preferably substantially zero with an insulating member interposed therebetween.

To make it easy to form the above arrangement, the field windings (23) are made of so called edge-wise coils. Edge-wise coils are formed by bending flat type conductive wires (made of, for example, copper) with a rectangular cross section. Specifically, the edge-wise coils are formed by winding flat type conductive wires with one of the faces having shorter width of four faces of the flat type conductive wires except both end faces being bent inwardly, and each have an outer surface with an insulating coating. The use of these edge-wise coils allows the field windings (23) to be formed with excellent dimensional accuracy. Hereinafter, the width of the longer side of the cross section of the flat type conductive wires is called the "width (W)" of the flat type conductive wires, and the shorter side is called the "thickness (t)" of the flat type conductive wires.

—Armature Windings (24)—

The armature windings (24) are configured for forming rotary magnetic fields. The armature windings (24) are supplied with AC power for the purpose of forming rotating magnetic fields. For example, if the armature windings (24) are three-phase armature windings, the armature windings (24) should be supplied with three-phase AC power. The AC electricity flowing through the armature windings (24) can be controlled through an inverter circuit, etc.

In the stator (20), each of the armature windings (24) is wound around the corresponding teeth (211) and housed in the corresponding armature slots (213b). More specifically, each of the armature windings (24) is wound around the corresponding one of the pairs of the teeth (211) (hereinafter also referred to as a pair of armature teeth (211b)) interposed between the corresponding pair of the armature slots (213b) adjacent to each other along the circumference of the stator yoke (212). Specifically, each of the armature windings (24) is wound around the corresponding one of the pairs of the armature teeth (211b), with the radial axis regarded as a winding axis. In other words, each of the armature windings (24) is, as a concentrated winding, wound around the corresponding one of the pairs of the teeth (211b) regarded as a single teeth. As viewed specifically in FIG. 1, for example, an armature winding (24-1) is wound around the corresponding one of the pairs of the armature teeth (211b) composed of teeth (211-1) and (211-2) interposed between the armature slots (213b-1) and (213b-2), which are adjacent to each other along the circumference of the stator yoke (212).

Similarly, another armature winding (24-2) is wound around the corresponding one of the pairs of the armature teeth (211b) composed of teeth (211-4) and (211-5) interposed between the armature slots (213b-1) and (213b-3), which are adjacent to each other along the circumference of the stator yoke (212). In this way, according to this embodiment of the present invention, each of the armature slots (213b) houses corresponding two of the armature windings (24).

In this embodiment, each of the armature windings (24) is constituted by a group of edge-wise coils (hereinafter also referred to as a group of windings), and has a shape of square cylinder. More specifically, one of the armature windings (24) is formed by a corresponding one of the groups of windings made of three edge-wise coils. Also in the armature windings (24), it is possible to form the armature windings with excellent dimensional accuracy by employing the edge-wise coils.

Figure 4:
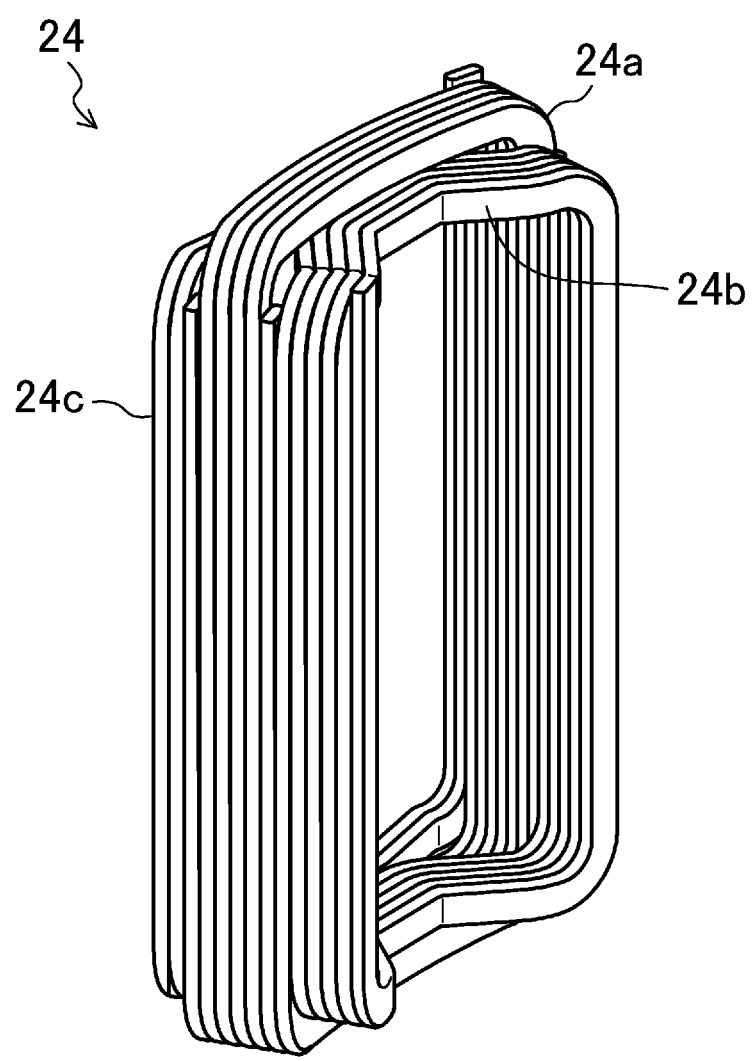
FIG. 4 is a perspective view of an armature winding (a group of windings) viewed from an inner circumferential side.
Figure 5:
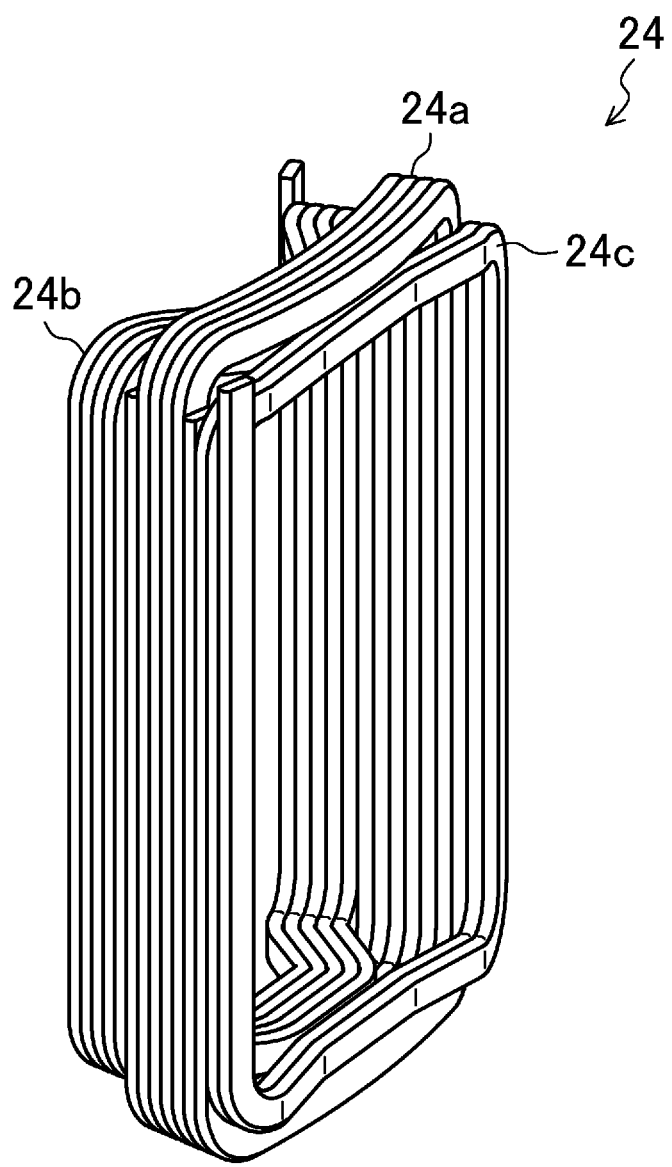
FIG. 5 is a perspective view of the armature winding viewed from an outer circumferential side.
Figure 6:
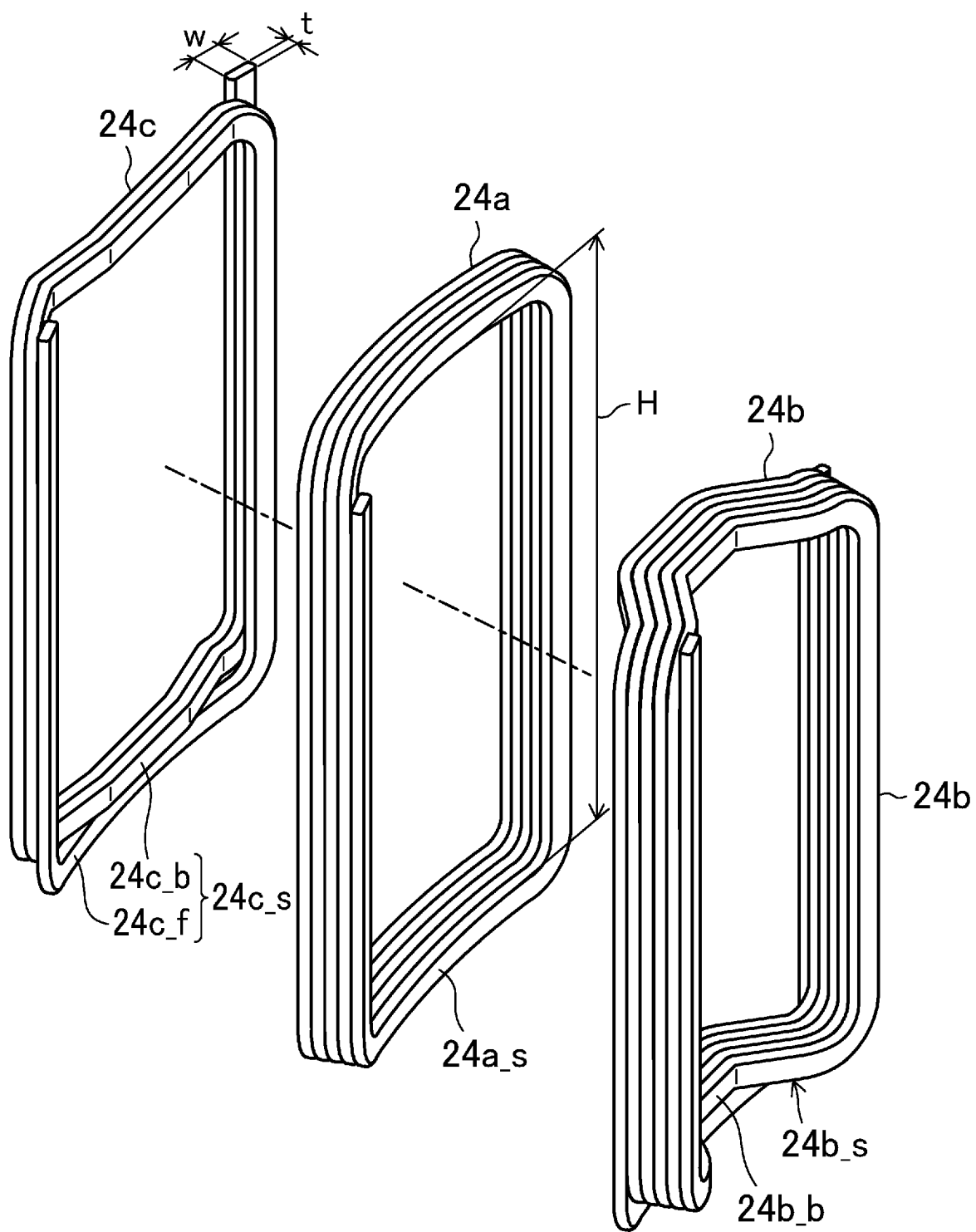
FIG. 6 is a perspective view of each of edge-wise coils constituting the group of windings (armature winding).

In this embodiment, the edge-wise coils constituting the corresponding one of the groups of windings have respectively different shapes to obtain as may numbers of turns of the armature windings (24) as possible. FIG. 4 is a perspective view of one of the armature windings (24) (group of windings) viewed from an inner circumferential side. FIG. 5 is a perspective view of one of the armature windings (24) viewed from an outer circumferential side. FIG. 6 is a perspective view of edge-wise coils constituting one of the groups of windings (armature windings (24)). As shown in FIG. 6, the armature windings (24) are constituted by an intermediate winding (24a), an inner winding (24b), and an outer winding (24c). These windings (24a, 24b, 24c) are made of flat-type copper wires like the field windings (23). In this example, as the flat type conductive wires constituting these windings (24a, 24b, 24c), ones with the same width (W) and the same thickness (t) as those used for the field windings (23) are used.

—Intermediate Winding (24a)—

The intermediate winding (24a) is one example of a first winding of the present invention. In this example, each of the teeth (211) is configured such that core members with the same shape are layered. Hence, each of the armature windings (24) can be regarded to be wound around the corresponding one of the teeth having a rectangular cross section orthogonal to the winding axis. Hence, the intermediate winding (24a) has a shape of square cylinder (see FIGS. 4 and 6). That is, when the intermediate winding (24a) is viewed in the winding axis, the intermediate winding (24a) has the longitudinal side (longer side) corresponding to the axial direction of the electric motor (1), and the shorter side facing the teeth (211). For convenience of description, hereinafter the part corresponding to the shorter side of the rectangular intermediate winding (24a) is called a shorter side part (24a_s).

This shorter side part (24a_s) faces an axial end face of the teeth (211), as described above, and corresponds to the coil end of the intermediate winding (24a). In this example, as described later, the dimension of the longitudinal direction of the intermediate winding (24a) (refereed to as an axial length (H)) is set such that clearance can be made between the axial end face of an armature teeth (211b) and the shorter side part (24a_s) with the intermediate winding (24a) attached on the armature teeth (211b). The axial length (H) is the shortest distance between the corresponding shorter side parts (24a_s). In this example, the clearance between the intermediate winding (24a) and the armature teeth (211b) substantially corresponds to the width (W) of the flat type conductive wires. As shown in FIG. 3, the radial width (specifically, the number of turns) of the intermediate winding (24a) is set such that the intermediate winding can be housed between the corresponding ones of the field windings (23o) and (23i) in radial direction.

—Inner Winding (24b)—

The inner winding (24b) is one example of a second winding of the present invention. The inner winding (24b) is provided closer to the inner circumferential side than the intermediate winding (24a) is (see FIG. 4). The inner winding (24b) has a shape of square cylinder (see FIGS. 4 and 6). In this square cylinder shape, the cross section orthogonal to the winding axis is rectangular, and the longer side of this rectangular shape faces in the axial direction of the electric motor (1). That is, when the inner winding (24b) is viewed along the winding axis, the inner winding (24b) has a rectangular shape with its longitudinal side (longer side) extending in the axial direction of the electric motor (1). For convenience of description, hereinafter the part corresponding to the shorter side of the rectangular shape of the inner winding (24b) is called a shorter side part (24b_s), and the longer side of the inner winding (24b) is called a longer side part (24b_1). This shorter side part (24b_s) faces an axial end face of the teeth (211), and corresponds to the coil end of the inner winding (24b).

In the inner winding (24b), each of the shorter side part (24b_s) is bent radially outward (i.e. toward the shorter side part (24a_s) of the intermediate winding (24a)). Here, the part thus bent of the shorter side part (24b_s) of the inner winding (24b) is called a bent part (24b_b).

The bent part (24b_b) of the inner winding (24b) overlaps a surface of the shorter side part (24a_s) of the intermediate winding (24a) at the side of the teeth (211) (see FIG. 4). As described above, the axial length (H) (see FIG. 4) of the intermediate winding (24a) is set such that a clearance substantially corresponding to the width (W) of the flat type conductive wires is formed between each of the shorter side part (24a_s) of the intermediate winding (24a) and the teeth (211). Hence, each of the bent parts (24b_b) is inserted between the corresponding one of the teeth (211) and the corresponding one of the intermediate windings (24a).

—Outer Winding (24c)—

The outer winding (24c) is also one example of the second winding of the present invention. The outer winding (24c) is disposed closer to the outer circumferential side than the intermediate winding (24a) is. The outer winding (24c) has also a shape of square cylinder (see FIG. 6). Also in this shape of square cylinder of the outer winding (24c), the cross section orthogonal to the winding axis is rectangular, and the longer side of this rectangular shape extending in the axial direction of the electric motor (1). For convenience of description, hereinafter the part corresponding to the shorter side of the rectangular shape of the outer winding (24c) is called a shorter side part (24c_s). This shorter side part (24c_s) faces an axial end face of the teeth (211), and corresponds to the coil end of the outer winding (24c).

Each of the shorter side parts (24c_s) of the outer winding (24c) has a part bent radially inward and a straight part that is not bent (see FIG. 6). Hereinafter, a part thus bent radially inward of the shorter side part (24c_s) is called a bent part (24c_b), and a part that is not bent is called a flat part (24c_f). In this embodiment, as shown in FIG. 6, in each of the shorter side parts (24c_s) of the outer winding (24c), the bent part (24c_b) and the flat part (24c_f) overlap each other such that the bent part (24c_b) faces the teeth (211). That is, in the outer winding (24c), the flat type conductive wires overlap each other in the axial direction in parts corresponding to the coil ends.

In the outer winding (24c), each of the bent parts (24c_b) also overlaps the corresponding one of the shorter side parts (24a_s) of the intermediate winding (24a) (see FIG. 5). As described above, the axial length (H) (see FIG. 4) of the intermediate winding (24a) is set such that a clearance substantially corresponding to the width (W) of the flat type conductive wires is formed between the shorter side part (24a_s) of the intermediate winding (24a) and the teeth (211). Hence, each of the bent parts (24c_b) is inserted between the corresponding one of the teeth (211) and the corresponding intermediate winding (24a).

—Positional Relationship Between Each Coil and Permanent Magnet—

As for the positional relationship of the field windings (23) to the permanent magnets (22), FIG. 1 illustrates that the field windings (23) face one of the permanent magnets (22) on both inner and outer circumferential side of the permanent magnet (22) in the field slot (213a). More specifically, two of the field windings (23) are provided for one of the pairs of the teeth (211a). These field windings (23) are in contact with one of the permanent magnets (22) on either inner or outer circumferential sides of the permanent magnet (22). The ones of the field windings (23), which face to each other on the inner and outer circumferential sides, with the corresponding one of the permanent magnets (22) interposed therebetween, are wound in the same direction as viewed from ends of the field windings (23), through which a current from the power source (30) flows in.

In the following description, if the field windings (23) on the inner and outer circumferential sides of the permanent magnets (22) need to be distinguished from each other, the field windings (23) on the inner circumferential side are represented by field windings (23i), with the suffix "i" added to the reference numeral of the field windings (23), while the field windings (23) on the outer circumferential side are represented by field windings (23o), with the suffix "o" added to the reference numeral of the field winding (23). If specific one of the field windings (23i) and (23o) is focused on, branch numbers are further added to the suffixes (e.g., 23i-1 and 23o-1).

The layout of the permanent magnets (22) and the field windings (23) according to this embodiment is viewed specifically in FIG. 1. For example, the field winding (23o-1) is wound around the pair of field teeth (211a) composed of the teeth (211-2) and (211-3) interposed between the field slots (213a-1) and (213a-2) adjacent to each other in the circumference of the stator yoke (212). The field winding (23o-1) is located closer to the outer circumferential side than the permanent magnet (22-1) or (22-2) is. Similarly, the field winding (23i-1) is wound around the teeth (211-2) and (211-3). This field winding (23i-1) is located closer to the inner circumferential side than the permanent magnet (22-1) or the permanent magnet (22-2) is.

These field windings (23) are DC-excited, if necessary. For this purpose, the field windings (23) are connected to a power source (30) (see FIG. 1). Further, various type of power sources (30) may be used as the power source supplying direct current to the field windings (23). For example, a chopper circuit (e.g., a step-down chopper circuit, a step-up chopper circuit or a step-up-and-down chopper circuit) may be used as the power source (30) to easily control the direct current flowing to the field windings (23). In other words, the direct current flowing to the field windings (23) may contain a pulsating component.

In this embodiment, all the field windings (23o) on the outer circumferential side of the permanent magnets (22) are connected to each other in series. Similarly, all the field windings (23o) on the inner circumferential side of the permanent magnets (22) are connected to each other in series.

As for the relationship of the permanent magnets (22) to the armature windings (24), in this example, each of the armature windings (24) straddles the predetermined one of the field slots (213a). A coil end of the armature windings is arranged such that a part of the armature winding (24) passes over respective axial end faces of the corresponding one of the permanent magnet (22) in the predetermined one of the field slots (213a) which the armature winding (24) straddles. FIG. 3 shows an arrangement of coil ends of the armature windings (24) etc. Taking an armature winding (24-1) as an example, this armature winding (24-1) straddles a field slot (213a-1), as shown in FIG. 3. In this case, the armature winding (24-1) is arranged such that the coil end of the armature winding (24-1) at its intermediate winding (24a) (shorter side part (24a_s)) passes over the permanent magnet (22-1) (over the axial end face thereof).

The armature winding (24-1) is housed in the armature slot (213b-1). In this armature slot (213b-1), there is also housed another armature winding (24-2). In this stator (20), the armature windings (24) are arranged side by side in the armature slots (213b) in the circumferential direction of the stator yoke (212). For example, in the armature slot (213b-1), there are arranged side by side the armature windings (24-1) and (24-2) in the circumferential direction of the stator yoke (212) (see FIGS. 1 and 3). In the same manner, in this embodiment, a total of 12 coil ends of the respective armature windings (24) are arranged on the end face of the stator core (21).

—Positional Relationship of Armature Windings to Field Windings—

Figure 7:
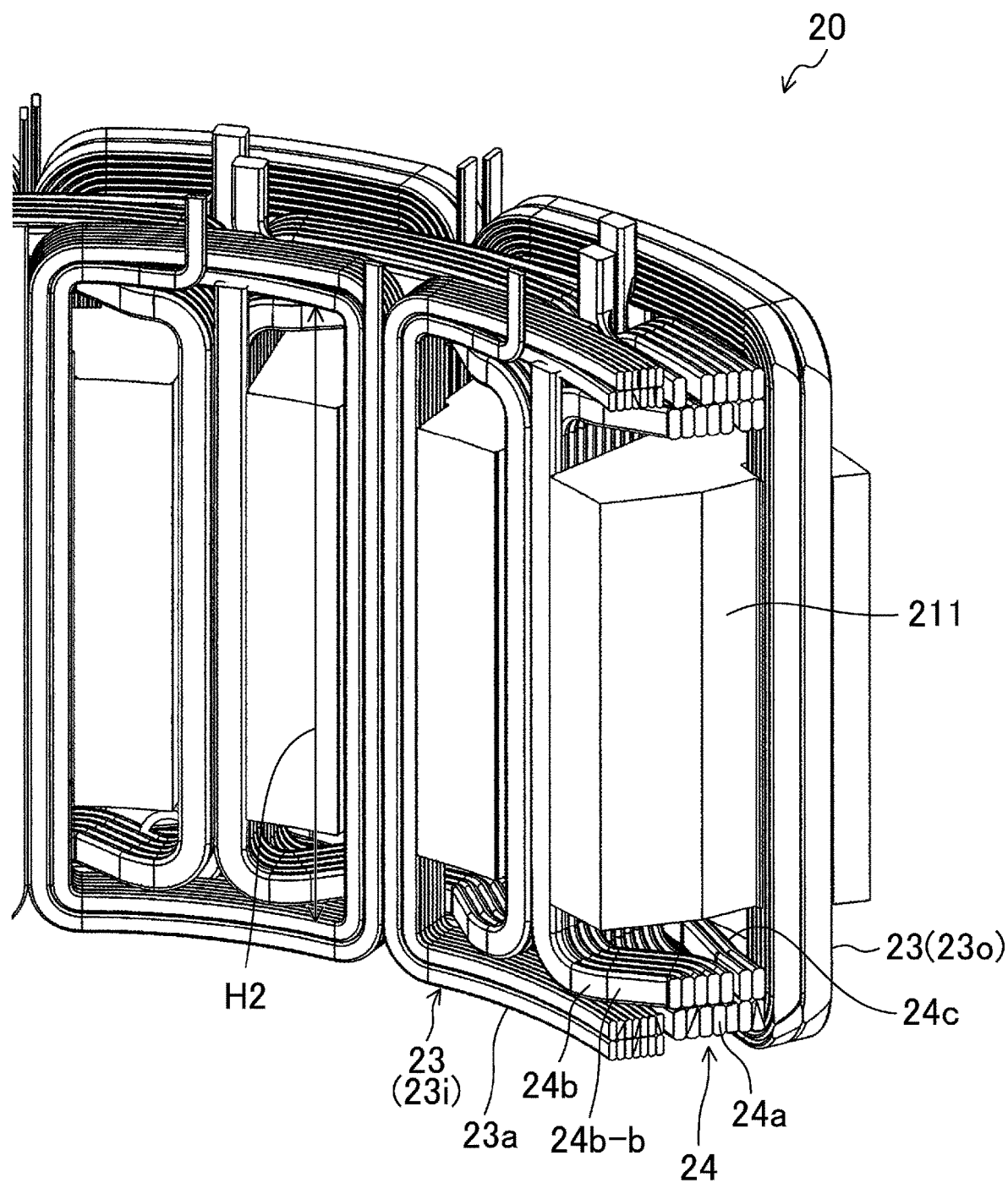
FIG. 7 is a cross-sectional perspective view of a stator taken along line VII-VII of FIG. 3.
Figure 8:
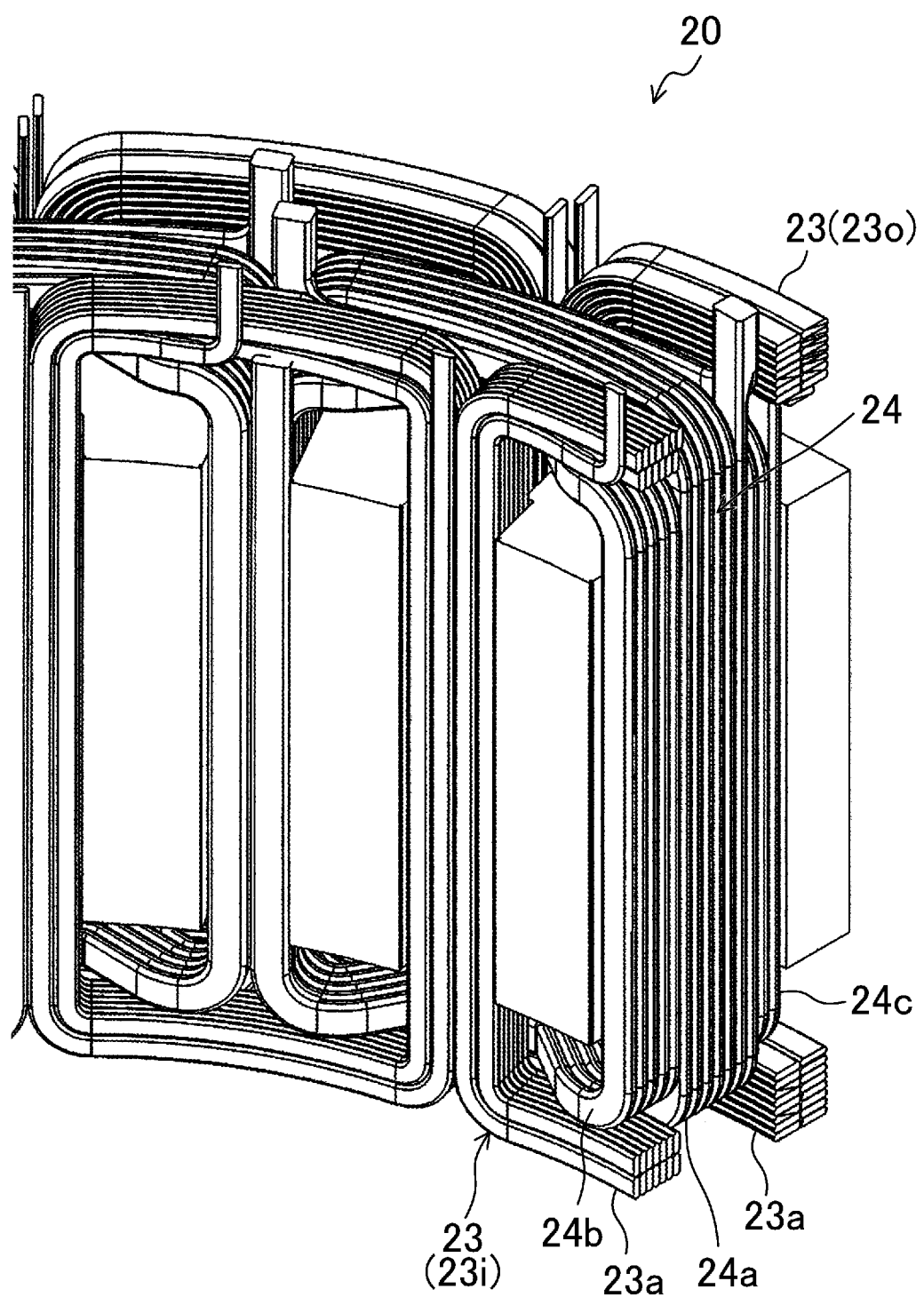
FIG. 8 is a cross-sectional perspective view of the stator taken along line VIII-VIII of FIG. 3.

In this embodiment, in order to increase the numbers of turns of the armature windings (24) as many as possible, a special design is provided for the positional relationship of the armature windings (24) to the field windings (23) (specifically, overlap of these two kinds of the windings). FIG. 7 shows a cross-sectional perspective view of a stator (20) taken along line VII-VII of FIG. 3. FIG. 8 shows a cross-sectional perspective view of a stator (20) taken along line VIII-VIII of FIG. 3. In the inner winding (24b), ends of the bent parts (24b_b) (corresponding to corners and their vicinities of the square cylinder) are embedded between the coil ends (23a) of the field windings (23) and the teeth (211) around which the field windings (23) are wound (see FIG. 7). To achieve this, the axial length (H2) of the field windings (23) is set such that a clearance substantially corresponding to the width (W) of the flat type conductive wires can be formed between the field windings (23) and the teeth (211). The axial length (H2) is the shortest distance between the corresponding shorter side parts.

Similarly, in the outer winding (24c), ends of the bent parts (24c_b) (corresponding to corners and their vicinities of the square cylinder) are embedded between the coil ends (23a) of the field windings (23) and the teeth (211) around which the field windings (23) are wound (see FIG. 8). This can be easily achieved because a clearance substantially corresponding to the width (W) of the flat type conductive wires is formed between the field windings (23) and the teeth (211). Further, the respective bent parts (24b_b, 24c_b) of the inner winding (24b) and the outer winding (24c) are formed such that the bent parts do not go out of the field windings (23) in the radial direction while the inner winding (24b) and the outer winding (24c) overlap with the field windings (23).

As described above, in this embodiment, the inner winding (24b) and the outer winding (24c) each include the parts embedded between the coil ends (23a) of the field windings (23) and the teeth (211) around which the field windings (23) are wound. In this way, it is possible to increase the numbers of turns of the armature windings (24) at a portion where the armature windings (24) overlap the field windings (23). With this configuration, it is possible to shorten the entire length in the axial direction of the armature windings (24) (distance between the adjacent coil ends) compared with the case in which the numbers of turns of the armature windings (24) are increased merely through omitting the overlap of the armature windings (24) and field windings (23).

Advantages of Embodiment

As described above, in this embodiment, the field windings (23) and the armature windings (24) are configured to overlap each other in portions corresponding to the coil ends. Accordingly, in this embodiment (in a hybrid excitation flux switching motor), it is possible to increase the conducting cross-sectional area of each of the armature windings in its associated slot while avoiding the increase in size of the coil ends.

Edge-wise coils can be easily used as the manner of winding in this embodiment. As a result, it is possible to reduce the copper loss and to improve the space factor in the electric motor (1). Instead of the edge-wise coils, flat-wise coils can also be used as the winding manner in this embodiment. Also in the case of the use of the flat-wise coils, it is possible to reduce the copper loss and to improve the space factor in the electric motor (1).

Second Embodiment

Figure 9:
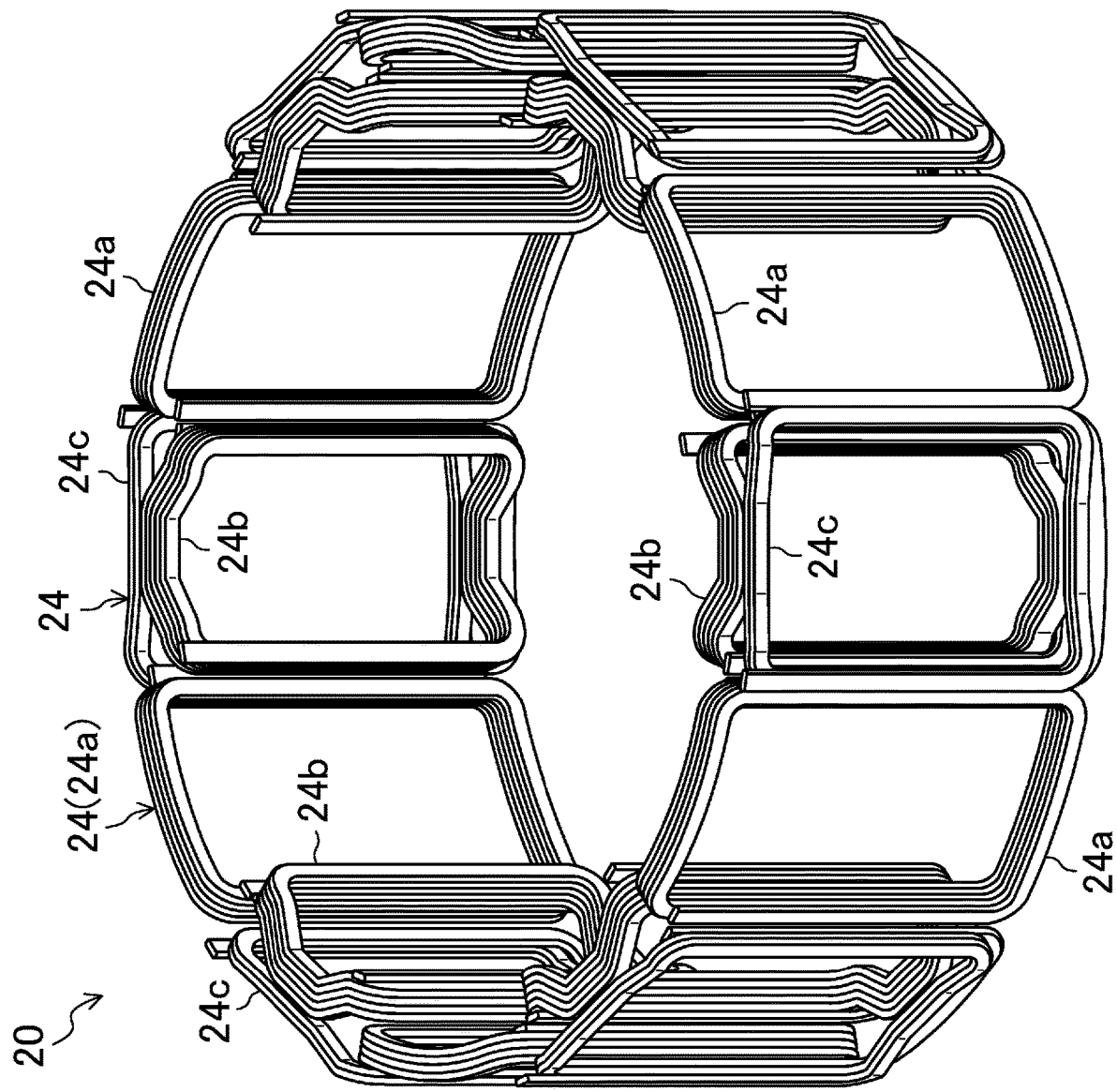
FIG. 9 is a perspective view showing the armature windings of a second embodiment.

FIG. 9 is a perspective view showing the armature windings (24) of the second embodiment. Note that the stator core (21), the field windings (23) and the permanent magnets (22) are omitted in FIG. 9 for the sake of clarification of the arrangement of the armature windings (24). In the stator (20) of this embodiment, the armature windings (24) including only an intermediate winding (24a) and the armature windings (24) made of groups of windings including an inner winding (24b) and an outer winding (24c) are alternatively arranged along the circumference of the stator yoke (212).

Also in this configuration, like in the first embodiment, it is possible to increase the conducting cross-sectional area of each of the armature windings in its associated slot while avoiding the increase in size of the coil end.

Third Embodiment

Figure 10:
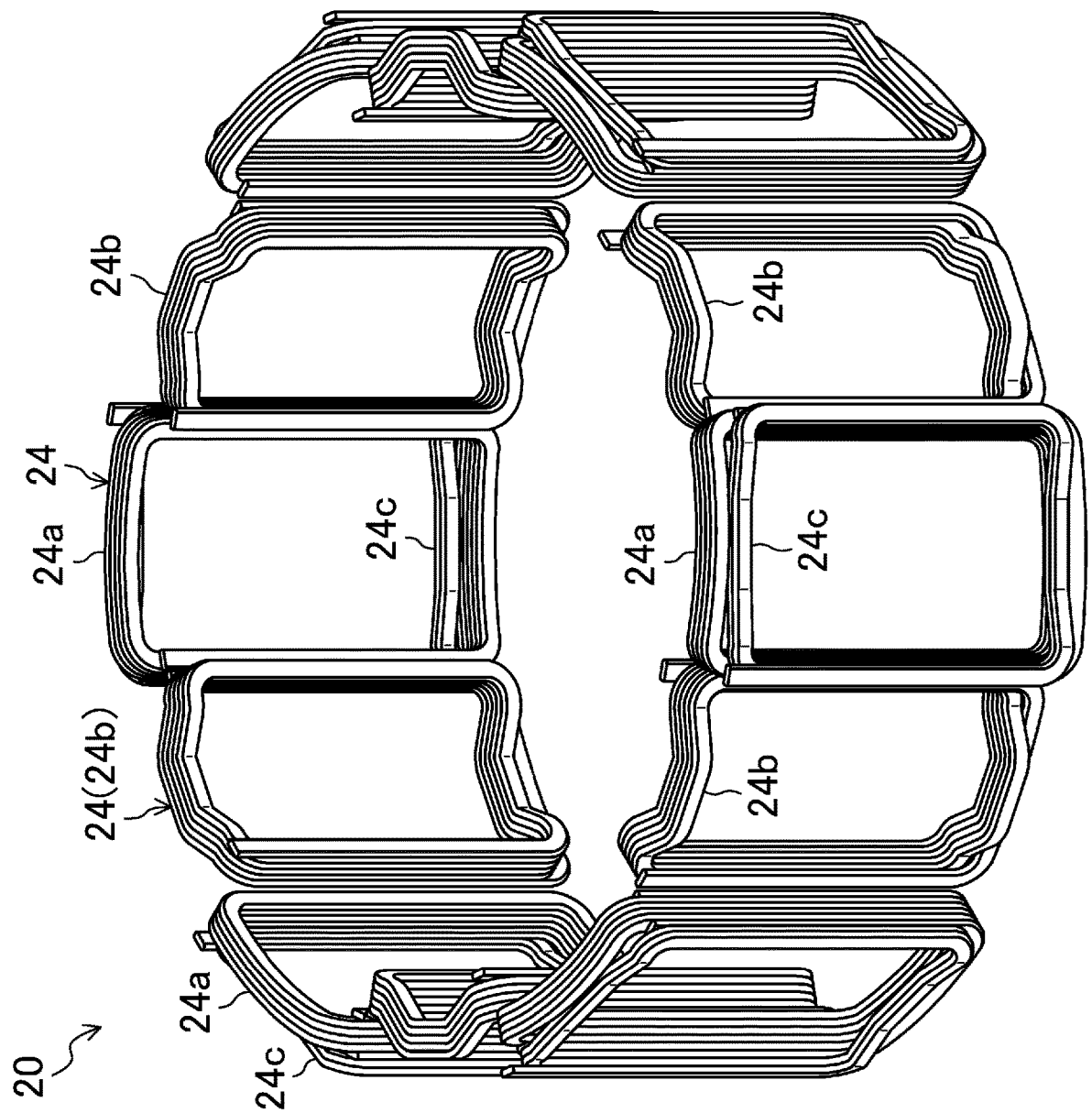
FIG. 10 is a perspective view showing the armature windings of a third embodiment.

FIG. 10 is a perspective view showing the armature windings (24) of the third embodiment. Note that the stator core (21), the field windings (23) and the permanent magnets (22) are omitted also in FIG. 10 for the sake of clarification of the arrangement of the armature windings (24). In the stator (20) of this embodiment, the armature windings (24)

including only an inner winding (24*b*) and the armature windings (24) made of groups of windings including an intermediate winding (24*a*) and an outer winding (24*c*) are alternatively arranged along the circumference of the stator yoke (212).

Also in this configuration, like in the first embodiment, it is possible to increase the conducting cross-sectional area of each of the armature windings in its associated slot while avoiding the increase in size of the coil end.

OTHER EMBODIMENTS

The intermediate winding (24*a*), the inner winding (24*b*) and the outer winding (24*c*) constituting the corresponding one of the armature windings (24) may be parallely connected to each other. When these windings (24*a*, 24*b*, 24*c*) are parallely connected to each other, they preferably have the same impedance and the number of turns.

Further, the configuration of the windings (23, 24) described in connection with the above embodiments is also applicable to a generator in addition to the electric motor (1).

The number of the teeth (211) of the stator (20) or the number of the projections (111) of the rotor (10) are merely examples, and the present invention is not limited to the embodiments.

Further, the materials of the permanent magnets (22) are merely exemplary ones. It is also possible to form the permanent magnets (22) from magnet materials free from heavy rare-earth elements.

INDUSTRIAL APPLICABILITY

The present invention is useful as a electric rotary machine.

DESCRIPTION OF REFERENCE CHARACTERS

1 Motor (Electric rotary machine)
11 Rotor Core
21 Stator Core
22 Permanent Magnet
23 Field Winding
23*a* Coil End
24 Armature Winding
24*a* Intermediate Winding (First Winding)
24*b* Inner Winding (Second Winding)
24*c* Outer Winding (Second Winding)
211 Teeth
213 Slot
213*a* Field Slot
213*b* Armature Slot

The invention claimed is:

1. A electric rotary machine, comprising:
    at least one field winding supplied with direct current;
    at least one armature winding supplied with alternative current;
    a stator core formed into a circular shape having a plurality of field slots and a plurality of armature slots arranged side by side in a circumferential direction, the field slots being slots in which the field windings are arranged, the armature slots being slots in which the armature windings are arranged;
    at least one permanent magnet housed in each of the field slots;
    a rotor core facing the stator core with a predetermined air gap interposed therebetween; and
    a first winding and at least one second winding constituting one of the armature windings, the first winding passing over the permanent magnet, the second windings each having a part embedded between a coil end of the field winding and a teeth around which the field winding is around.

2. The electric rotary machine of claim 1, wherein
    the field windings are arranged both on an inner circumferential side and an outer circumferential side of the permanent magnets, and
    the armature windings each include the second windings respectively corresponding to an inner and an outer coil ends of the corresponding field windings.

3. The electric rotary machine of claim 2, wherein
    the second windings are kept from going out of the field windings in a radial direction.

4. The electric rotary machine of claim 1, wherein
    the first winding and the second windings have the same impedance and the same number of turns, and are parallely connected to each other.

5. The electric rotary machine of claim 1, wherein
    the first winding and the second windings are connected to each other in series.

6. The electric rotary machine of claim 1, wherein
    the field windings and the armature windings are at least one of edge-wise coils obtained by bending flat type conductive wires and flat-wise coils.

* * * * *